Oct. 4, 1927.
H. J. FRIEDL
1,643,946
TRANSMISSION OR BRAKE BAND
Filed June 11, 1925
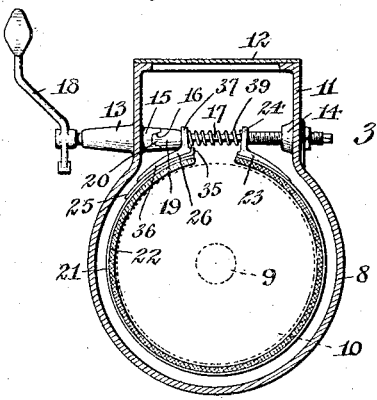
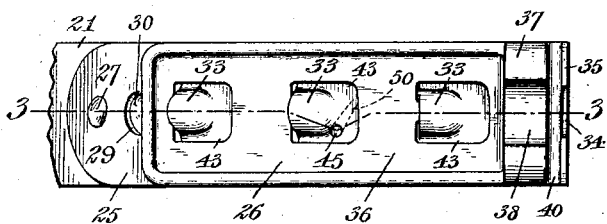
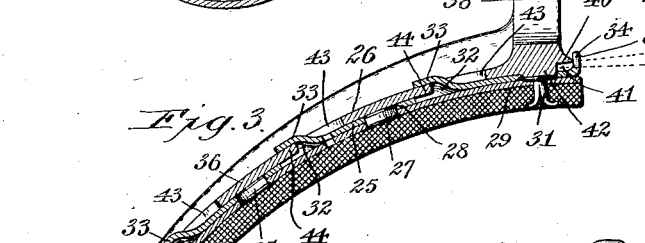
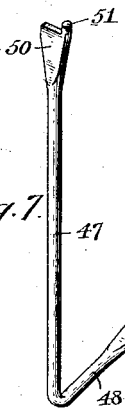
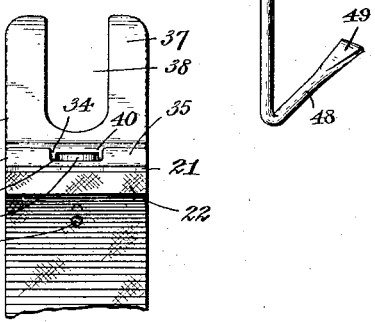
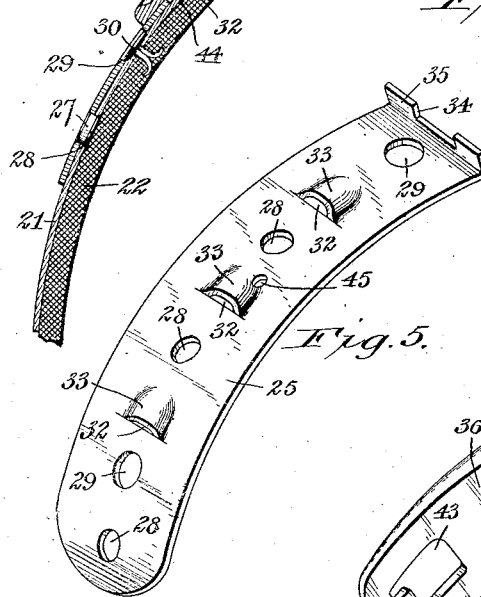
Hugh J. Friedl, Inventor.
By Emil Neukart, Attorney.
Witness:
J. J. Oberst, Patented Oct. 4, 1927.

1,643,946

UNITED STATES PATENT OFFICE.

HUGH J. FRIEDL, OF BUFFALO, NEW YORK.

TRANSMISSION OR BRAKE BAND.

Application filed June 11, 1925. Serial No. 36,373.

My invention relates to automobile transmission or brake bands, and more particularly to that type applied to planetary transmission mechanism, such as employed in Ford automobiles.

The invention relates more specifically to that type of transmission or brake band wherein the ends of the band are provided with connectors adapted for co-action with parts of operating mechanism manipulated by foot pedals, and in which one of the connectors is removably secured to one of the ends of the band to permit of more readily removing the band from the casing enclosing the transmission mechanism, and also to permit of more readily inserting a band into said casing around a drum forming part of such transmission mechanism.

It is one of the objects of my invention to provide a removable connector at one end of a transmission brake band which can be quickly and securely fastened to the band, and as readily removed therefrom, and in connection with which I preferably employ a suitable tool to aid in the ready attachment and convenient removal of the connector from said band.

Another object of my invention is to provide a removable connector at one end of the transmission or brake band, and to so construct the connector and co-operating portion of the band that a secure fastening of the connector to the band is provided without allowing movement relatively in any direction.

A further object of my invention is to reinforce the brake band proper at the point of connection of the detachable connector thereto, and to employ as a means of reinforcement a separate member having parts stamped therein, removed therefrom, and fashioned thereon for co-operation with said connector to the end that said connector may be quickly and securely fastened to the brake band and be as readily removed therefrom.

With the above and other objects in view to appear hereinafter, the invention consists in the novel features of construction and in the arrangement and combination of parts to be hereinafter described and more particularly pointed out in the subjoined claims.

In the drawings:—

Fig. 1 is a transverse section through a transmission casing of a Ford automobile, showing one of the drums of a transmission mechanism and the shaft therein in dotted lines, and showing an edge view of a transmission or brake band located within said casing and co-acting with pedal-operated spring-retrieved mechanism for applying the brake to the drum and for releasing the same therefrom.

Fig. 2 is a plan view of one end of the brake or transmission band equipped with my improved removable connector and the reinforcement directly associated and co-acting therewith.

Fig. 3 is a longitudinal section taken on line 3—3, Fig. 2.

Fig. 4 is an end view of the band showing that end thereof having the detachable connector applied thereto.

Fig. 5 is a detached perspective view of the reinforcement applied to one end of said band.

Fig. 6 is a detached perspective view of the detachable connector.

Fig. 7 is a perspective view of the tool, preferably employed for fastening the connector to the band and removing said connector therefrom.

Reference being had to the drawings in detail, the numeral 8 designates the transmission casing of an automobile through which a shaft is passed lengthwise, said shaft being indicated in dotted lines and designated by the numeral 9.

On the shaft is indicated with dotted lines a drum 10 of which there are invariably three arranged in close juxtaposition, one serving as a clutch drum, the second as a combined brake and reverse drum, and the third as a slow speed drum, but it is quite apparent that these drums may serve in any other manner or for any other purpose. Only one of the drums referred to is shown in the drawing, but it is to be understood that a brake band is used in connection with each drum and operated by individual foot-operated mechanism.

The transmission mechanism casing is formed with an upward extension or bonnet 11 open at its upper end and having said upper end closed by a cover 12, which is removable to permit access to the interior to said casing.

On the side walls of the bonnet 11, bearings 13, 14 are formed; said bearings being transversely alined and part of each extends outwardly from its supporting wall, while a second part extends inwardly therefrom; the inward extension 15 of the bearing 13 being provided with cam notches 16.

Mounted for combined rocking and sliding movement in the bearing 13 is a shaft 17 to which an operating pedal 18 is secured. On said shaft adjacent the inward extension 15 of the bearing 13 is a cam collar 19 having lugs 20 fitting the notches 16 of said inward extension 15 and being so arranged that upon rocking said shaft, when depressing the pedal 18, the lugs 20 ride on the inclined surfaces of the notches 15 and move said shaft 17 inwardly while rotating. This part of the mechanism is not a part of my invention and is used simply to illustrate the mode of operating the brake or transmission band, as the case may be, and although such mechanism is now in common use it may be otherwise constructed, if desired.

The brake or transmission band is designated by the numeral 21 and is constructed of comparatively thin spring steel curved into open ring formation and having the usual lining 22 riveted or otherwise applied to its inner surface. Applied to one end of this band is the usual fixed connector 23 fastened to said band in any approved manner, usually by riveting the same thereto. The outer end of this fixed connector has an outwardly-directed forked ear or lug 24, the notch of which opens outwardly.

The brake or transmission band thus far described is commonly used in Ford automobiles, with a second connector at the other end thereof solidly fastened thereto, and in some instances detachable connectors have been applied directly to the thin spring steel open ring at the other end thereof, but in a manner different from that herein disclosed and forming part of this invention.

At the last-mentioned end of the band my improved detachable connector and a reinforcement associated therewith are arranged; the reinforcement being designated by the numeral 25 and the detachable connector by the numeral 26. The reinforcement is formed of a strip of metal somewhat longer than the detachable connector and curved to conform to the curvature of the band, to which it is riveted, as shown at 27, suitable rivet holes 28 being formed in said reinforcement and similar rivet holes being provided in the band 21 for the reception of the rivets which are suitably headed therein.

The reinforcement, or reinforcing strip, as it may be termed, is also provided with two additional holes 29, one near the inner end of the strip and the other in close proximity to the outer end thereof, the hole 29 at the inner end of said strip serving to permit a clench or other rivet 30 to be passed therethrough and through a suitable opening in the brake or transmission band at a point directly beneath, which last-mentioned rivet may be passed through the lining 22 for the purpose of fastening the same to the inner side of the band. The opening 29 at the outer end of the reinforcing strip is used for a similar purpose and for co-action with a part of the detachable connector, as and in the manner to be hereinafter described. Through this last-mentioned opening 29, a second clench or other rivet 31 is passed, which is also passed through an opening in the brake or transmission band and through the lining 22. It will therefore be apparent that even though the reinforcing strip 25 is permanently fastened to the brake band, the openings 29 permit of conveniently attaching the lining 22 to the brake band, and when the lining becomes worn, permits of conveniently withdrawing the rivets 30 and 31 for the purpose of removing the lining from the band to be replaced with a new lining, which can be quickly attached by means of rivets, such as 30, 31.

The reinforcing strip 25 is provided with ear-receiving pockets 32 formed by slitting the strip transversely and centrally through a portion of its width at spaced intervals, and stamping the metal of the strip outwardly at one side of each slit so as to provide a reinforcing strip having external protuberances 33 open at one end to form said pockets, said protuberances forming depressions on the inner side of said reinforcing strip serving as said pockets.

At the outer end of said reinforcing strip, the metal thereof is cut away or notched, as at 34, and it is bent along a transverse line inward of said notch so as to form an upstanding flange 35 having said notch or cut-away portion 34 therein. The inner wall of said notch or cut-away portion is therefore positioned at a comparatively slight elevation above the outer surface of the body portion of said reinforcing strip, while the parts of said flange at opposite sides of said notch extend outwardly to a greater extent.

The detachable connector 26 comprises an arcuate base portion 36 which lies against the outer side of the reinforcing strip 25 and has at its outer end the forked outwardly-extending ear or lug 37, the notch 38 of this ear being transversely alined with the notch in the ear or lug 24 of the fixed connector 23.

When the detachable connector is secured to the band, in the manner to be hereinafter described, the shaft 17 is passed through the two notches in the ears 24 and 37, respectively, of the two connectors, with a spring 39 surrounding said shaft and being interposed between said ears, opposite ends of said spring bearing against the opposed ears of said connectors and serving to separate the connectors; thereby releasing the band 21 from the drum.

At its outer end the detachable connector 26 is provided with a transverse bead or extension 40, and the under side of said connector is provided with a groove 41, which extends inwardly from the edge of this bead or extension. At the inner end of said groove a retainer stud 42 is located. That portion of the bead or extension overhanging the groove 41 serves as a catch lip medially disposed between the side edges of said connector, and when the connector is attached to the band, this catch lip lies in a plane outside of or above the inner wall of the notch 34 formed in the upstanding flange 35 at the outer end of the reinforcing strip 25. The under side of this catch lip, which is also the inner or top wall of the groove 41, is therefore spaced from the outer surface of the reinforcing strip.

The arcuate base portion 36 of the detachable connector is provided with spaced openings 43, which are preferably rectangular in formation, said base portion having a retainer ear 44 extending inwardly into each of said openings 43 from the inner end wall thereof.

When positioning the detachable connector on the band, the external protuberances in the reinforcing strip extend outwardly through said openings, and the retainer ears 44 are arranged in line with the pockets 32 formed by said protuberances, and when moving said detachable connector outwardly on said reinforcing strip, the retainer lugs or ears 44 enter said pockets.

Due to the fact that the curvature of the inner surface of the detachable connector conforms exactly to the outer surface of the reinforcing strip 25, the retainer stud 42 extending inwardly from the outer end of said detachable member rides along the outer surface of the reinforcing strip during the movement required to fully enter the retainer ears 44 into the pockets 32. This creates a flexing action of the band and its retainer strip and necessitates some effort to force the detachable connector into proper position. For convenience in attaching the connector to the band, I have formed a fulcrum opening 45 in the reinforcing strip 25, preferably in close proximity to one of the protuberances 33 on said strip, and with the fulcrum opening so located, the placing of the detachable member upon the reinforcing strip positions the outer end wall of one of the rectangular openings 43 directly forward of the fulcrum opening so that a suitable tool fulcrumed or pivotally entered in said fulcrum opening may be swung against said outer end wall, and upon rotation of said tool force the detachable connector outwardly to overcome the resistance offered by the flexing of the band, with the result that the retainer ears or lugs 44 of the openings 43 will be forced into the pockets 32 of the protuberances 33 while the retainer stud 42 on the inner surface of the detachable connector will be snapped into the hole 29 at the outer end of said strip. It will therefore be clear that said hole 29, in addition to serving to permit a clench or other rivet to be passed therethrough for fastening the lining to the band proper, also serves to aid in retaining the detachable connector on said band. When the detachable connector is securely fastened in place, the transverse bead or extension 40 at the outer end of said connector is brought in contact with the upstanding flange 35 at the outer end of the reinforcing strip 25.

A convenient tool for fastening the detachable connector to the band and for detaching the same therefrom is illustrated in Fig. 7; it being constructed of a slender rod or bar formed to provide a body portion or shank 47 and an angular portion 48 at one end of said shank or body portion and, as designed, opposite ends of this tool serve as operating ends. The tool, when placing one end into service, has the angular portion 48 serving as a handle, and when placing the other end thereof into service, the shank 47 serves as a handle.

The outer or free end of the angular portion 48 is flattened, as at 49, to provide a thin or feathered end therefor. The other or free end of the body portion or shank 47 is likewise flattened, as at 50, and at one corner of the flattened portion it is provided with a fulcrum or pivot stud 51.

For the purpose of fastening the detachable connector to the band, after positioning the same loosely thereon, the pivot or fulcrum stud 51 on the tool is entered in the fulcrum opening 45 formed in the reinforcing strip and one or the other face of the flattened portion 50 is brought into contact with the outer end wall of one of the rectangular openings 43 formed in the connector, which in Fig. 2 is shown as the outer end wall of the intermediate opening 43, the flattened portion 50 of the tool being indicated by dotted lines in said figure. With the pivot or fulcrum stud 51 entered in the fulcrum opening 45 of the reinforcing strip, it is simply necessary to rotate said tool so as to force one corner of the flattened portion opposite the pivot or fulcrum stud 51 against the outer end wall of said opening 43 with sufficient pressure to force the retainer ears 44 fully into their receiving pockets 32 and to crowd the retainer stud 42 of said connector into alinement with the outer hole 29 in said reinforcing strip, whereupon the retainer stud will snap into said hole and assurance will be had that the connector will lie in firm contact with the outer surface of the reinforcing strip throughout the length of said connector.

In Fig. 2 the flat portion 50 of the tool is shown in contact with the outer end wall of the intermediate opening after said connector has been moved into fully locked position, and the tool may then be withdrawn from said opening. If desired, the fulcrum opening 45 may be extended through the band 21 proper, as shown in Fig. 3.

When using the stud end of the tool for the purpose of fastening the detachable connector in place, the angular portion 48 will serve as a handle for conveniently rotating said tool.

When it is desired to detach the connector from the band, the flattened end 49 of the tool is thrust through the notch 34 of the flange 35 at the outer end of the reinforcing strip and underneath the catch lip formed by the bead or extension 40. When so used, the shank 47 of the tool serves as a handle and it is simply necessary to swing the handle outwardly, with the result that the inner wall of the notch 34 will serve as a fulcrum point for the tool. Outward movement of the handle will therefore depress that part of the angular portion of the tool extending outwardly from said fulcrum point and exert an upward pressure of that portion extending through the notch 34 of the band, with the result that the retainer stud 42 will become disengaged from its receiving opening 29 in the reinforcing member, after which inward pressure on the detachable connector will cause the retainer ears 44 to move out of their receiving pockets, thereby causing complete disconnection of the detachable connector from the band.

It has, however, been found in practice that by drawing outwardly on the shank of the tool when the tool is positioned as shown in dotted lines in Fig. 3, and at the same time swinging the tool laterally, the retainer stud 42 will be disengaged from its receiving opening 29, and at the same time, the movement of the tool causing separation of the outer end of the connector and the outer end of the band is associated with a component movement tending to force the connector inwardly so that pressure independent of that exerted by the tool is not required to establish a complete disconnection of the detachable connector from the band.

I do not consider it necessary in all cases to provide the band with a reinforcing strip, as the pockets 32 formed in said retainer strip may be directly formed on the band, as clearly shown in my co-pending application filed February 17, 1925, Serial No. 9778, and in such cases the fulcrum opening 45 and the hole 29 adapted to receive the retainer stud 42, may be formed directly in the band. However, in such cases it is found necessary to construct the band of somewhat heavier gage material, since it has been found that the formation of the pockets in the band in addition to the forming of openings therein weakens the band, which will eventually result in the band breaking along the region at which the detachable connector is shown fastened.

By providing a reinforcing strip at the outer end of the band where the detachable member is fastened thereto, the regulation thickness of material found to possess the required flexibility for most efficient service may be used. At the same time the band is stiffened or reinforced to a degree believed necessary to provide a proper base or foundation for a detachable connector, so that the connector, when secured in place, will be as securely fastened as the rigid connector at the opposite end of the band. This is a decided advantage over the detachable connectors now in use, all of which have more or less freedom of action or play, resulting in noise and imperfect operation. However, where in the claims reference is made to the band, without specifically setting out a stiffening or reinforcing element for the band, it is understood to mean a band with or without a reinforcing element.

Having thus described my invention, what I claim is:—

1. A transmission or brake band, comprising an open ring band, a lining for said band, a short reinforcing strip fastened to the outer surface of said band at one end thereof whereby a stiffened end portion is provided while otherwise retaining the flexibility of the band and the true circular contour of said lining, said reinforcing strip having openings therethrough, rivets passed through said openings and through said band and lining for fastening the lining to said band, and a detachable connector secured to said reinforcing strip.

2. A transmission or brake band, comprising an open ring band, a lining for said band, a reinforcing strip applied to the outer side of said band at one end thereof whereby a stiffened end portion is provided while otherwise retaining the flexibility of said band and the true circular contour of said lining, said reinforcing strip having a retainer hole near its outer end, a detachable connector provided with an overhanging catch lip at its outer end spaced from said reinforcing strip and a retainer stud adjacent said catch lip entered into said retainer hole, and means for detachably connecting said connector to said reinforcing strip and for simultaneously therewith causing entrance of said retainer stud in said retainer hole.

In testimony whereof I affix my signature.

HUGH J. FRIEDL.